(12) United States Patent
Heer (10) Patent No.: US 6,257,186 B1
(45) Date of Patent: Jul. 10, 2001

(54) DEVICE FOR ADJUSTING THE PHASE ANGLE OF A CAMSHAFT OF AN INTERNAL COMBUSTION ENGINE

(75) Inventor: Siegfried Heer, Kirchdorf/Krems (AT)

(73) Assignee: TCG Unitech Aktiengesellschaft, Kirchdorf/Krems (AT)

(*) Notice: Subject to any disclaimer, the term of this patent is extended or adjusted under 35 U.S.C. 154(b) by 0 days.

(21) Appl. No.: 09/533,169

(22) Filed: Mar. 22, 2000

(30) Foreign Application Priority Data

| Mar. 23, 1999 | (AT) | ........................................... 538/99 |
| May 12, 1999 | (AT) | ........................................... 854/99 |
| Jul. 1, 1999 | (AT) | ........................................... 1142/99 |

(51) Int. Cl.[7] .................................................. F01L 1/344
(52) U.S. Cl. ..................................... 123/90.17; 123/90.31
(58) Field of Search ........................... 123/90.17, 90.31, 123/90.15; 74/568 R; 464/1, 2, 160

(56) References Cited

U.S. PATENT DOCUMENTS

| 4,770,060 | 9/1988 | Elrod et al. . | |
| 5,361,735 | * 11/1994 | Butterfield et al. | ................ 123/90.17 |
| 5,417,186 | 5/1995 | Elrod et al. . | |
| 5,598,814 | * 2/1997 | Schroeder et al. | ................. 123/90.11 |
| 5,680,837 | * 10/1997 | Pierik | ................. 123/90.17 |
| 5,979,382 | * 11/1999 | Heer | ................. 123/90.17 |
| 6,129,061 | * 10/2000 | Okuda et al. | ................. 123/90.17 |
| 6,138,622 | * 10/2000 | Heer | ................. 123/90.17 |
| 6,138,623 | * 10/2000 | Heer | ................. 123/90.17 |

FOREIGN PATENT DOCUMENTS

| 3320835 | 12/1984 | (DE) . |
| 3607256 | 9/1987 | (DE) . |
| 3929619 | 3/1991 | (DE) . |
| 4101676 | 7/1992 | (DE) . |
| 4110088 | 7/1992 | (DE) . |
| 4110195 | 10/1992 | (DE) . |
| 0596860 | 5/1994 | (EP) . |
| 0903471 | 3/1999 | (EP) . |
| 2221513 | 2/1990 | (GB) . |

* cited by examiner

Primary Examiner—Teresa Walberg
Assistant Examiner—Vinod D Patel
(74) Attorney, Agent, or Firm—Dykema Gossett PLLC

(57) ABSTRACT

The invention relates to a device for adjusting the phase angle of a camshaft of an internal combustion engine with a drive gear for driving a camshaft accommodated in a coaxial arrangement relative to the camshaft and with an electric motor for rotating the camshaft relative to the drive gear, the electric motor having two concentrically arranged rotors, of which the one is connected to the camshaft and the other to the drive gear. Simple and safe adjusting is achieved by having a first coil arrangement non rotatably linked to one of the rotors and electromagnetically interacting with a stationary coil arrangement in order to induce or to transmit the energy needed for the operation of the electric motor.

16 Claims, 10 Drawing Sheets

DEVICE FOR ADJUSTING THE PHASE ANGLE OF A CAMSHAFT OF AN INTERNAL COMBUSTION ENGINE

BACKGROUND OF THE INVENTION

The invention relates to a device for adjusting the phase angle of a camshaft of an internal combustion engine with a drive gear for driving a camshaft accommodated in a coaxial arrangement relative to the camshaft and with an electric motor for rotating the camshaft relative to the drive gear, wherein the electric motor has two concentrically arranged rotors, of which the one is connected to the camshaft and the other to the drive gear.

To obtain optimum values for fuel consumption and exhaust emissions in different areas of the internal combustion engine's operating characteristics, the valve timing must be varied in dependence of different operating parameters. An elegant manner of varying the valve timing is realized by rotating the camshaft relative to its driving gear. The camshaft of an internal combustion engine is usually driven by a sprocket wheel, which is connected to the crankshaft via a drive chain, or by a drive gear configured as a pulley, which is connected to the crankshaft via a toothed belt.

DESCRIPTION OF THE PRIOR ART

In GB 2 221 513 A a camshaft adjusting mechanism is described wherein an electric motor operates a set of link arms turning the camshaft relative to its driving gear. To this purpose an actuating element carrying the pivoted arms is shifted in axial direction. This solution however involves considerable expense and play on account of the large number of bearings.

In DE 41 10 088 C1 and DE 39 29 619 A1 adjusting mechanisms are described wherein an adjusting element is provided between a member connected to the camshaft and a member connected to the drive gear, which element has two helical threads meshing with corresponding threads of the camshaft or the drive gear. By axially displacing this adjusting element, the camshaft can be rotated relative to its drive gear. Axial displacement of the adjusting element may be obtained by actuating a hydraulic plunger which is operated in dependence of the desired adjustment. The disadvantage of this solution is that the forces required can only be attained with a large hydraulic plunger necessitating considerable constructional expense. Moreover, a comparatively large quantity of oil is required for operating the plunger, which will necessitate a suitably sized pump and thus add to the engine load. As a further drawback of this known type of mechanism, adjustment of the camshaft is possible only between two extreme positions.

An electric adjusting device also is presented in DE 41 01 676 A1, wherein an electric motor is provided for displacing the adjusting element by means of a threaded spindle. As the adjusting element rotates essentially at camshaft speed, an axial thrust bearing must be provided between the electric motor and the adjusting element, which takes up the relative movement between the non rotating and the rotating member. In the above solution, the thrust bearing is more or less permanently subject to load throughout the entire operating period, since the torsional moments acting between drive gear and camshaft will produce a force acting on the adjusting element in axial direction. For this reason the thrust bearing is a critical component which will limit the useful life of the engine. A similar solution is disclosed in DE 33 20 835 A1, wherein the same disadvantages are encountered.

In DE 36 07 256 A a mechanism is described, wherein a stepping motor is provided for adjusting the camshaft, which stepping motor being connected to both camshaft and drive gear. As the stepping motor must take up the entire driving torque for the camshaft, such a solution cannot be achieved within reasonable limits of expense.

This disadvantage is avoided in the adjusting device disclosed in DE 41 10 195 for two structural components connected in their rotating drive, in which an electric motor with a stationary stator is driving a planet carrier supporting a couple of concentric planet gears. Such a stationary electric motor however always has to run during operation, adjustment of the two structural components relative to one another being carried out by faster or slower run. To adjust such a device is complicated.

EP 0 596 860 A discloses a device for adjusting the valve opening times in which the camshaft has a hollow configuration and comprises an inner shaft. The cams are bipartite, wherein each single cam section can be turned relative to the other by a determined angle. The rotation of the two cam sections is executed by a revolving electric motor, which is supplied via slip rings. Similar solutions are disclosed in U.S. Pat. Nos. 5,417,186 and 4,770,060.

A former suggestion of the applicant, published in EP-A 0 903 471 presents an adjusting mechanism for the phase angle of a camshaft with a planetary gear set, in which the adjustment is executed by an electric motor that is supplied with current by means of slip contacts.

Adjusting the phase angle of a camshaft by means of an electric motor proved an advantageous solution in practical operation. To supply the electric motors by means of slip contacts however is the weak point of such devices.

SUMMARY OF THE INVENTION

It is an object of the present invention to avoid these drawbacks and to develop a device as described above in such a manner that slip rings, slip contacts and the like can be omitted.

It also is an object of the invention to have a first coil arrangement non rotatably linked to one of the rotors, said first coil arrangement electromagnetically interacting with a stationary coil arrangement in order to induce or to transmit the energy needed for the operation of the electric motor.

The main point of the invention is that the electric motor that occasions the adjustment of the camshaft is energized without any contact by a coil arrangement. The energy may hereby either be transmitted like in a transformer via an air core or be induced like in a generator. Since the electric motor is a rotating member, the following description will not distinguish stator and rotor of the electric motor, as this is generally the case, but will rather speak of two rotors. One of the rotors is basically connected to the camshaft, whereas the other rotor is connected to the drive gear which may be configured as a sprocket wheel or as a pulley wheel for receiving a toothed belt. Since the driving torque needed to adjust the phase angle of the camshaft is quite big, and since, on the other side, the adjusting angle is quite small, it commonly is necessary to provide a set of gears that converts a relative movement of the two rotors of some revolutions into a rotation of the camshaft relative to the drive gear of approximately 15° to 20°.

In a particularly preferred embodiment of the present invention the set of gears is composed of a rigid, circular hollow gear and of a flexible externally toothed gear, which is accommodated on a roller bearing with an elliptical inner ring that meshes with the hollow gear. Such a gear is commonly called a Harmonic-Drive. As already described above, a quite big step-up ratio is needed between the electric motor and the member it is driving, which may be achieved by such a set of gears. If for example the teeth of the hollow gear amount to 100 and the teeth of the elliptical gear amount to 98, the step-up ratio obtained is of about 1:50. Since this is achieved by a single-stage gear without using planet gear or the like, the device according to the invention may thus be of an extremely compact design.

To have a rotor directly connected to the elliptical inner ring of the roller bearing constitutes a particularly favorable solution in this connection. It is also of advantage when the internally toothed gear has entered a rigid connection with a rotor. Thanks to these measures, a simple and compact layout may be achieved.

The disadvantage of the Harmonic Drives of the art is that they only can be loaded to a limited extent because of their relatively fine teeth. Such gears are particularly sensitive to impulsive loads. In order to avoid this disadvantage, the gear may be made of the following component parts: a first plane of action arranged on the inner periphery of a first engaging part, a second plane of action arranged on the outer periphery of a flexible engaging part and engaging the first plane of action and a driving member arranged coaxially to the first engaging part and to the flexible engaging part, a roller bearing provided with a non circular inner ring being accommodated on said driving member and having a flexible outer ring connected to the flexible engaging part and pushing it by preferably two points against the first engaging part, wherein the first plane of action of the first engaging part frictionally engages the second plane of action of the flexible engaging part.

In such a gear, the evident allocation of the different component parts with regard to the phases and the exact transmission ratio of a toothed gearing is no longer given, but resistance to overload may thus be achieved, which is not possible with a toothed gearing. Furthermore, the gear according to the invention is unaffected by dirt and requires little lubrication.

A further advantage of the invention is that the eccentricity of the wave generator may be considerably smaller than in a toothed gearing of the art. In those traditional toothed gearings, it is necessary to make the eccentricity so big that the teeth of the first and of the second plane of action do not come into conflict outside the engaging areas. In the solution according to the invention, the eccentricity is only defined by the small path needed to establish a frictional engagement. That is why the deformation of the flexible engaging part during operation is considerably smaller, which reduces losses and increases service life.

In principle it is possible to have the first and the second plane of action meshing on one, two, three or more points. It proved particularly advantageous however to provide two opposite engaging points. In such a solution, the inner ring of the roller bearing is essentially elliptical in cross section.

Secure transmission of force may particularly be achieved by giving the first plane of action a conical shape with a small aperture angle. Eventual wear can thus be compensated, too. In this connection, it is particularly advantageous to have the aperture angle amounting to between 1° and 10°, preferably between 2° and 6°. In this case, the wave generator preferably is embodied in such a manner that the outer ring of the roller bearing has got a conical shape with a small aperture angle. The aperture angle of the outer ring should thereby essentially match the aperture angle of the first plane of action.

It is particularly advantageous to provide a pressure means that presses the first plane of action in axial direction against the second plane of action. An independent adjustment of the pressure force and with it of the transmissible torque may thus be achieved. The pressure means preferably is provided with a spring that prestresses the first engaging part and the flexible engaging part against each other in axial direction.

In a particularly preferred variant a rotor of the electric motor is essentially configured as a tube-shaped sleeve that supports on its inner circumference a winding electromagnetically interacting with a winding or with a permanent magnet arranged on the other rotor, the sleeve having on its external circumference a coil arrangement cooperating with a stationary coil arrangement. A particularly simple bearing of the movable component parts is thus made possible. The inner rotor may for example support permanent magnets interacting with windings arranged on the inner circumference of the outer rotor. By feeding the outer rotor with alternate current of an appropriate frequency, the electric motor may be operated like a synchronous machine. In theory, it is also possible to configure the inner rotor as a squirrel-cage rotor and to operate the electric motor as an asynchronous motor. These variants have the advantage that the inner rotor needs not to be fed with external power. Higher efficiency may be achieved however by energizing the inner rotor electromagnetically, too.

The coil arrangements comprise at least one winding each that is essentially accommodated in circumferential direction. Thus, the electric current transmitted by the coil arrangement becomes independent of the camshaft's speed. This is important, since the transmission executed by the coil arrangement not only supplies the power for the operation of the electric motor, but also includes the control data.

In this connection it is particularly advantageous to have the sleeve rigidly connected to the drive gear. The rigid connection is also to be used in case the sleeve is configured integral with the drive gear.

Thanks to the preferred configuration of the inner rotor as a tube-shaped sleeve, the construction of the device and particularly its erection may be considerably facilitated, since the whole adjusting device may essentially be fastened onto the camshaft by means of one single screw.

In another variant of the present invention one rotor is connected to the other rotor via a ribbon cable in order to transmit electric power for the energization of a rotor. In this solution, advantage has been taken of the fact that the two rotors move in opposite direction during only a few revolutions. In this solution, one rotor is fed with power via a coil arrangement. The other rotor is communicating with the first rotor via the ribbon cable. In this connection, it is particularly advantageous to have one rotor fitted with an electronic control unit for evaluating the control signals transmitted through the ribbon cable. In this way, the current needed to supply a rotor may be changed by the control unit, in its frequency for example. It is thus possible to imitate for example the functioning of a stepping motor.

In an alternative variant of the invention the two rotors are each provided with an independent coil arrangement, each of which interacting with a corresponding stationary coil arrangement. Thanks to the independent energization, an independent energization of windings in both rotors may be achieved easily, too.

It also is advantageous to have the first coil arrangement and the stationary coil arrangement configured as a rotary current generator. Electric current may thus be produced in a particularly easy and reliable manner. The current production in this generator depends on the energizing current so that the motor may be driven in a simple way. If need be, a second field winding may be provided, which brings the rotor to slow down in order to also effect in a fast and reliable way a backward adjustment. As an alternative, the current produced by the generator may be phase shifted in a corresponding circuit element before it is fed to the electric motor, which also makes a return of motion possible.

A compact design and a particularly fast response characteristic may also be achieved even at low speed when the stationary coil arrangement is provided with a number of poles which is superior to the one of the rotors of the electric motor. The slip of the squirrel-cage rotor may thus efficiently be compensated.

A preferred variant of the invention has the drive gear communicating with the crankshaft via a frictionally engaged drive. A frictionally engaged drive, for example a V-ribbed belt, is of advantage for being considerably cost-saving. However, the clear phase relation of the drive gear to the crankshaft of the internal combustion engine gets lost. This may be compensated by the adjusting device according to the invention, which offers unlimited adjusting possibilities.

The present invention will be described more explicitly in the following with the help of the embodiments illustrated in the figures.

DETAILED DESCRIPTION OF THE PREFERRED EMBODIMENTS

Figure 1:
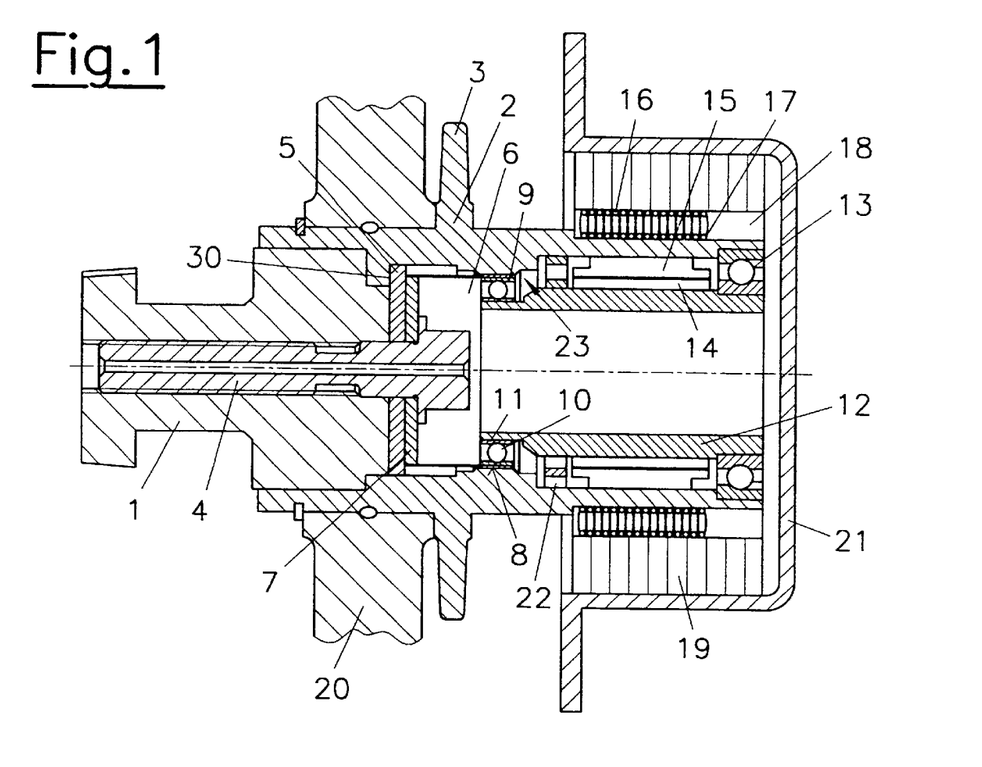
FIG. 1 is a longitudinal section through a first variant of the invention.

The device of FIG. 1 consists of a camshaft 1 and of a sleeve 2 which is rotatable relative to the camshaft 1 and which has a sprocket wheel 3 configured in such a way that it is integral with it. A gear 6 is connected to the camshaft 1 by means of a screw 4 and a disk 5, which gear 6 is configured as a thin-walled cylinder terminated at one end by a rigid disk 7. The screw 4 secures the disk 7 of the gear 6 non rotatably relative to the disk 5 and the camshaft 1. In the area 8, the sleeve 2 is configured as a circular, internally toothed gear that engages the gear 6. By its inner side, the gear 6 props on the outer ring 9 of a roller bearing 10 which is configured as a ball bearing. The inner ring 11 of the roller bearing 10 has got an elliptical shape so that the gear 6 only engages the internally toothed area 8 of the sleeve 2 by two points facing each other in circumferential direction. The number of teeth of the gear 6 is smaller by two than the number of teeth of the internally toothed area 8 that constitutes a hollow gear. The inner ring 11 of the roller bearing 10 is rigidly connected in an inner rotor 12, which is essentially shaped like a tube. On the opposite end, the rotor 12 is borne on the sleeve 2 via a ball bearing 13. On its outer periphery, the inner rotor 12 carries a winding 14 interacting with a winding 15 configured on the inner periphery of the sleeve 2, which constitutes the outer rotor. The windings 14 and 15 are further connected by a ribbon cable 22 that transmits electric current from the sleeve 2 onto the inner rotor 12. The ribbon cable 22 has got length enough to bridge the potential area of rotation of the rotors 2, 12 running in opposite directions. An electronic control unit, which is not illustrated in FIG. 1, may be provided to change for example the frequency of the current transmitted to the winding 14 in order to change accordingly the speed of the inner rotor 12 relative to the sleeve 2.

The electric power for energizing the windings 14 and 15 is obtained by a stationary coil arrangement 16, which cooperates with a coil arrangement 17 arranged on the sleeve 2. In order for the current transmission across the air gap 18 to be independent of the speed of the sleeve 2, the coil arrangements are wound in circumferential direction. Sheet iron 19 is used to reinforce the electromagnetic field.

The sleeve 2 is rotatably borne opposite the housing 20, which has been only hinted at, and the whole device is closed by a cover 21. Thanks to the tube-like configuration of the rotor 12, the complete device except for its cover 21 may be fastened by only screwing in the screw 4 on the camshaft 1.

Operation of the device of the present invention now will be described more thoroughly. If the adjusting angle of the camshaft 1 cannot be changed, it is actually not necessary to energize the electric motor, since the set of gears 23 consisting of the gears 6, 8 is self-locking. In order to secure the position, a current may however be transmitted via the coil arrangements 16, 17, which keeps the windings 14, 15 in a stable position relative to one another. In this case, drive gear 3 and camshaft 1 rotate at the same speed. If the phase angle of the camshaft 1 can be adjusted, a motor-actuated control feeds the coil arrangement 16 with an appropriate voltage that is transmitted to the coil arrangement 17 on the sleeve 2. The current induced therein supplies the winding 15 on the sleeve 2 and, via the ribbon cable 22 and the control unit, the winding 14 on the inner rotor 12. In the simplest case, the control unit may be configured as a rectifier circuit that feeds the windings 14 with a constant direct current so that the magnetic polarity existing on the periphery of the outer rotor 2 is independent of the frequency of the alternative current transmitted through the coil arrangements 16, 17. An alternating current however is applied on the outer winding 15 and produces a rotating electromagnetic field effecting a rotation of the inner rotor 12 relative to the sleeve 2. Since the gear 6 has two teeth less than the hollow gear 8, one complete revolution of the inner rotor 12 causes the camshaft 1 to rotate relative to the sleeve 2 to the extent of two teeth. Therefore, the torque that has to be produced on the electric motor only constitutes a small fraction of the actually required adjusting torque.

Figure 1A:
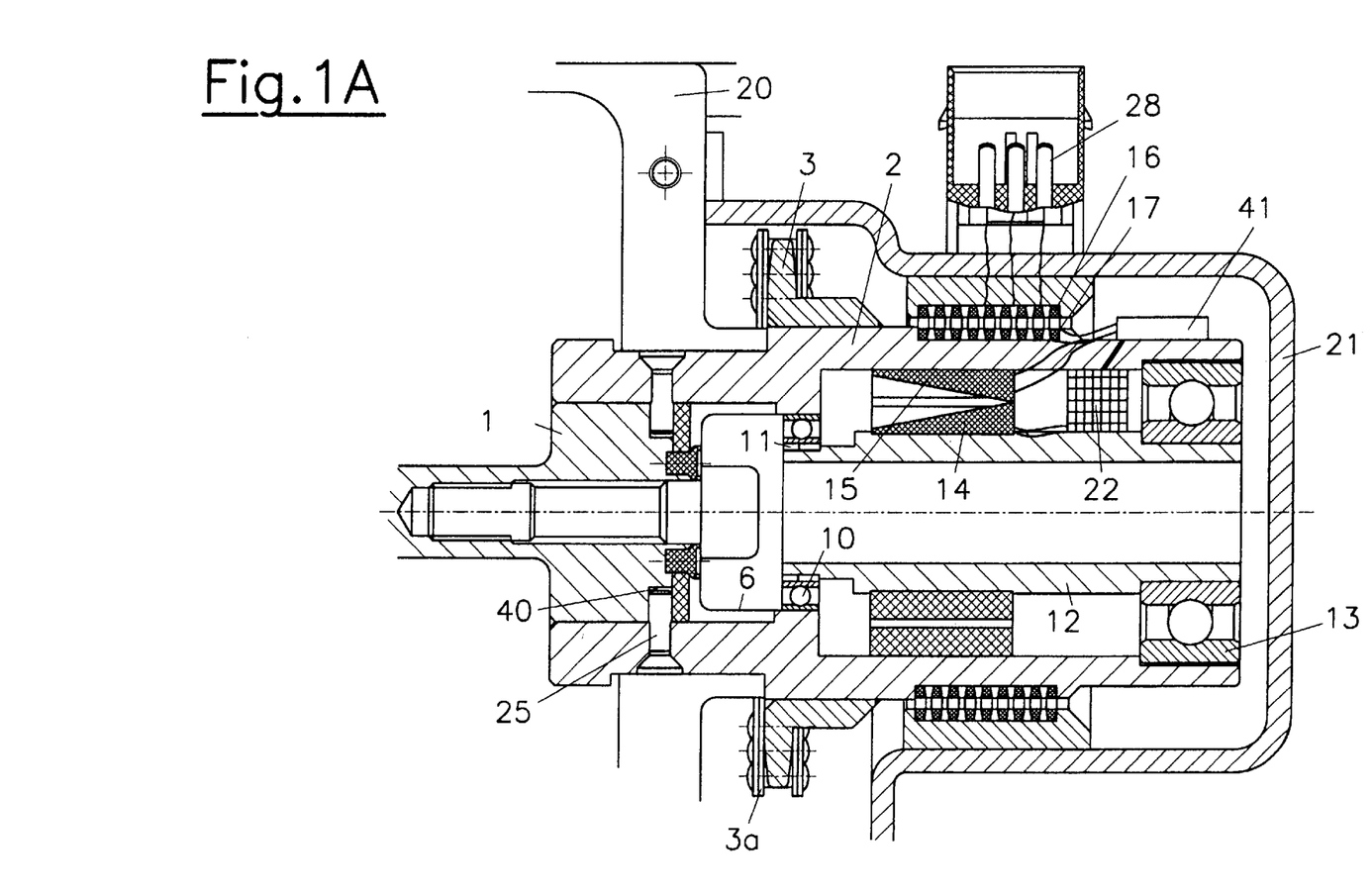
FIG. 1A is a slightly modified variant of the embodiment in FIG. 1.

The variant of FIG. 1A widely corresponds to the one of FIG. 1. The analogous parts are referred to with the same reference numerals and are not described again in the following. In this variant of an embodiment, screws 25 are screwed in the sleeve 2 in radial direction, said screws engaging into ring segment shaped recesses 40 of the camshaft 1. The allowable rotating angle of the camshaft 1 is thus defined. This variant also differs from the afore described one by its cover 21 that is pulled over the sprocket wheel 3 and directly fixed to the housing 20. The drive chain 3a is illustrated in FIG. 1A. FIG. 1A also shows the control unit 41 which is supplied by the coil arrangement 17. The winding 15 on the sleeve 2 is directly energized via the control unit 41, whereas the winding 14 on the rotor 12 is fed via the ribbon cable 22. In this variant, the control unit 41 may be formed in such a manner that the control pulses transmitted by pulse-width modulation are used together with the actual driving power for producing two alternating currents in order to energize the windings 14 and 15. At the same frequency, no rotation takes place and the adjusting angle of the camshaft 1 remains the same. A leading or a lagging movement of the camshaft 1 may be occasioned by an appropriate difference in frequency. Thanks to a Hall detector or the like, which is not illustrated in the drawings herein, it is possible to get some information about the instant adjusting angle of the camshaft 1. Power supply occurs via connections 28 that communicate with the coil arrangement 16.

Figure 2:
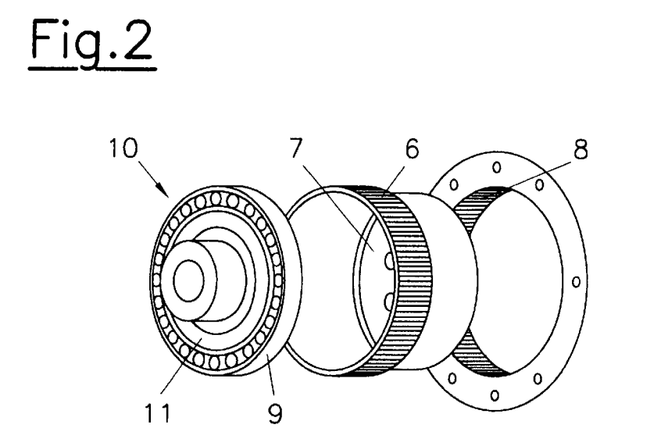
FIG. 2 is an exploded view of a common Harmonic Drive.

FIG. 2 shows details of a Harmonic Drive in an axonometric exploded view. The inner ring 11 of the roller bearing 10 is elliptic with a slight eccentricity. The outer ring 9 is directly supported by the inner side of a flexible gear 6. This gear 6 meshes by two opposite points with a rigid, internally toothed gear 8, which has got a circular shape.

Figure 3A:
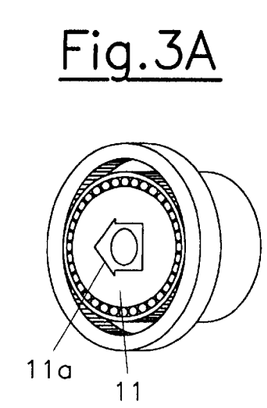
FIGS. 3A, B, C, D are representations intended to explain the way a Harmonic Drive operates.
Figure 3B:
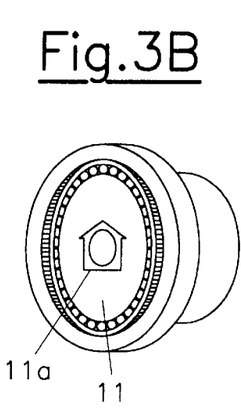
Figure 3C:
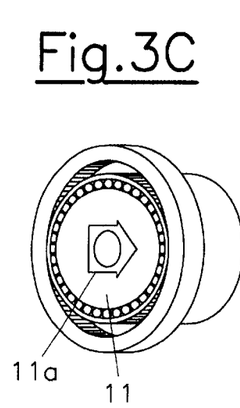
Figure 3D:
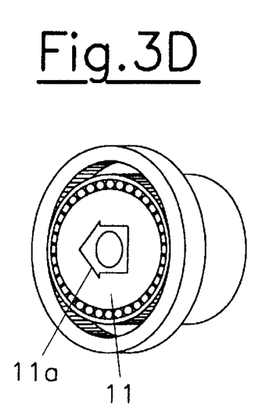

FIGS. 3A, B, C and D show the mode of operation of this Harmonic Drive. In the position shown in FIG. 3B, the inner ring 11 is rotated 90° clockwise relative to the position shown in FIG. 3A. The FIG. 3C shows a further rotation by 90° and FIG. 3D one complete revolution by 360°. For the sake of clarity, an arrow 11a was introduced into the FIG. 3A, B, C and D. The number of teeth of the flexible gear 6 is smaller by two than the number of teeth of the internally toothed gear 8. A small difference in angular velocity between gear 6 and gear 8 arises out of it. As may be seen in the Figures, the sign 6a that alludes to the gear 6 is moved slowly counterclockwise while the inner ring 11 is turning. As a whole, the rotating angle corresponds to the central angle of two teeth of the gear 6.

Figure 4:
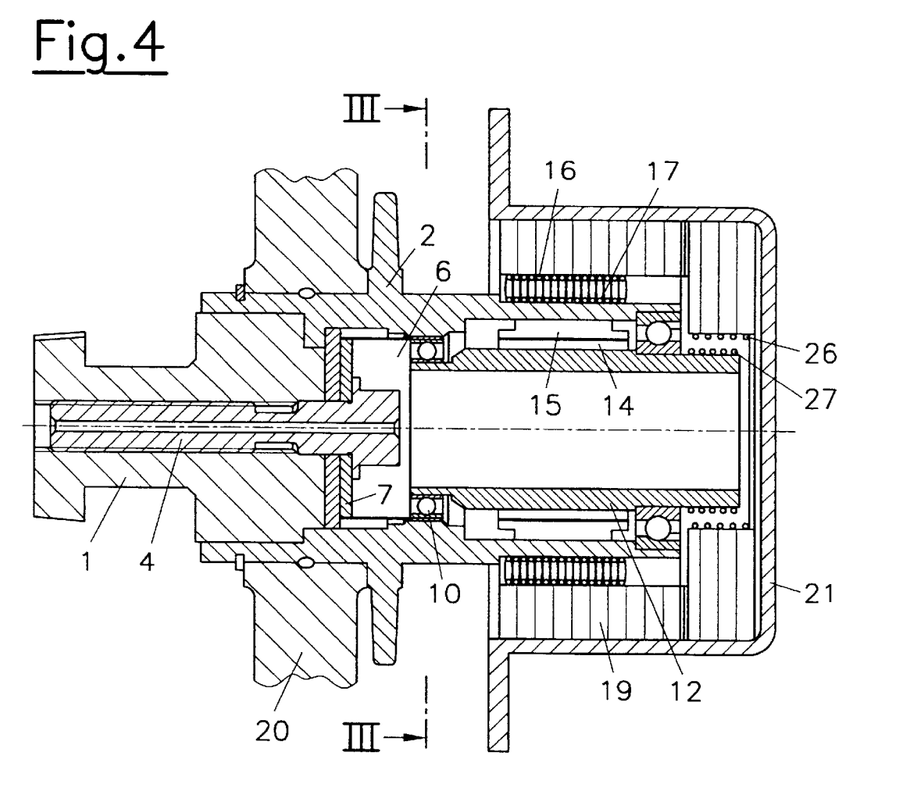
FIG. 4 to 8 are longitudinal sections or partially axonometric representations in vertical section of further variants of the invention.

The variant of FIG. 4 only differs from the variant of FIG. 1 by having the winding 14 of the inner rotor 12 supplied via a separate coil arrangement 27 that interacts with another, stationary coil arrangement 26. Thus, intensity of current, frequency and phase position of the currents in the windings 14 and 15 may be adjusted irrespective of one another. Control may thus be structured with particular degrees of freedom.

It is noted that in cases in which the adjusting torque is small, permanent magnets may be arranged on the inner rotor 12, said permanent magnets cooperating with a winding 15 on the sleeve 2. In this way, one pair of coil arrangements feeding the winding 15 on the sleeve 2 may suffice and it is no longer necessary to provide a ribbon cable like in the variant in FIG. 1 or another coil arrangement like in the embodiment of FIG. 2.

In order to ensure emergency operation in case of failure of the adjusting device, a projection 30 is provided in the sleeve 2, said projection engaging a peripheral groove of the camshaft 1 so that adjustment is possible in an allowable range only.

Figure 5:
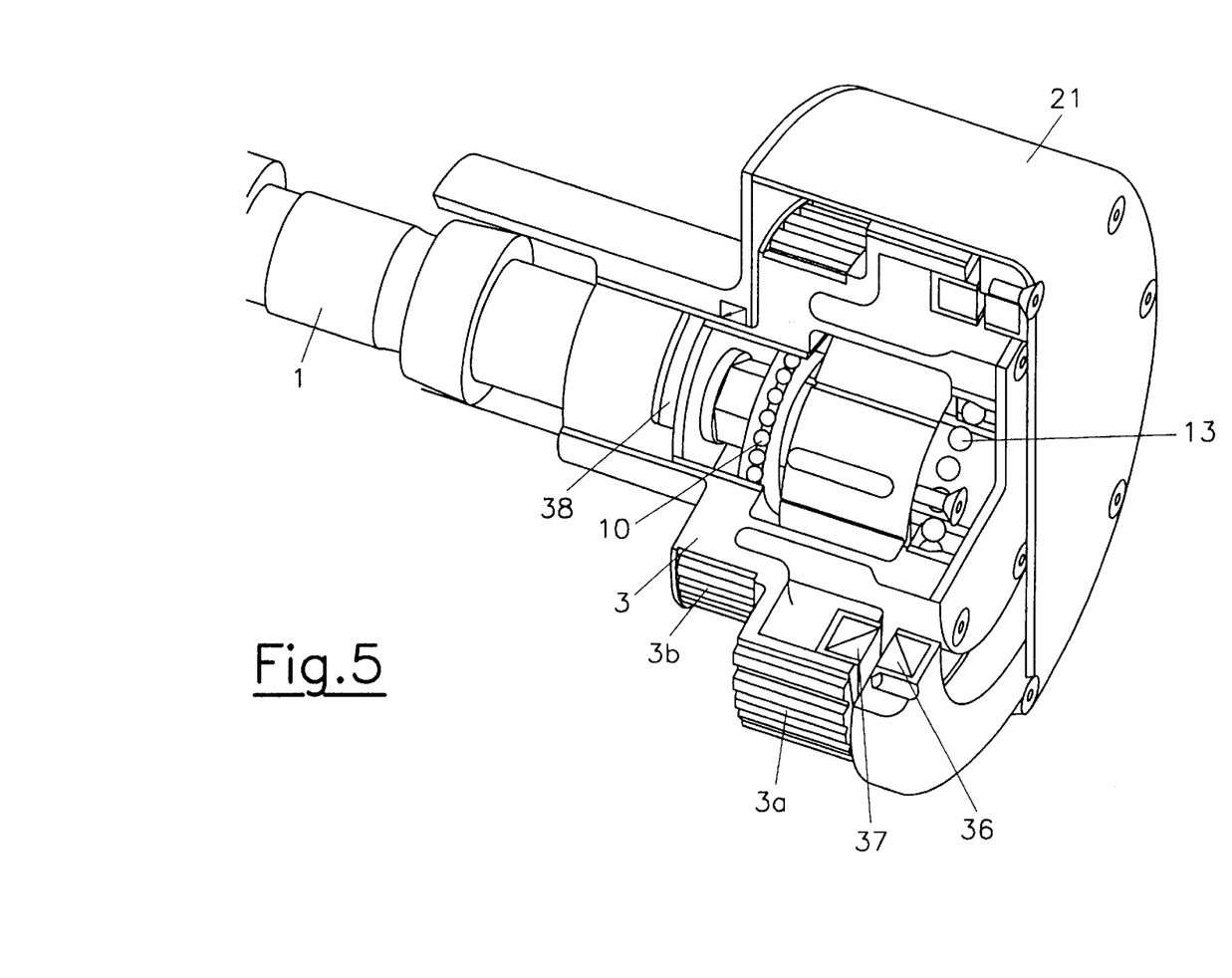

In the variant of FIG. 5, the coil arrangements 36, 37 are arranged in such a way that their front sides are conspiring. The drive gear 3 is configured as a pulley having two engagement surfaces 3a and 3b, one of them serving to receive a toothed belt (not shown) driving said pulley via a crankshaft, whereas the other is provided to drive another camshaft (not shown). Furthermore, a recess 38 having the shape of a circular segment is provided in the camshaft 1, a mating projection communicating with the drive gear 3 engaging said recess in order to limit the motion of rotation.

The remaining structure is similar to the one of the afore described variant.

Figure 6:
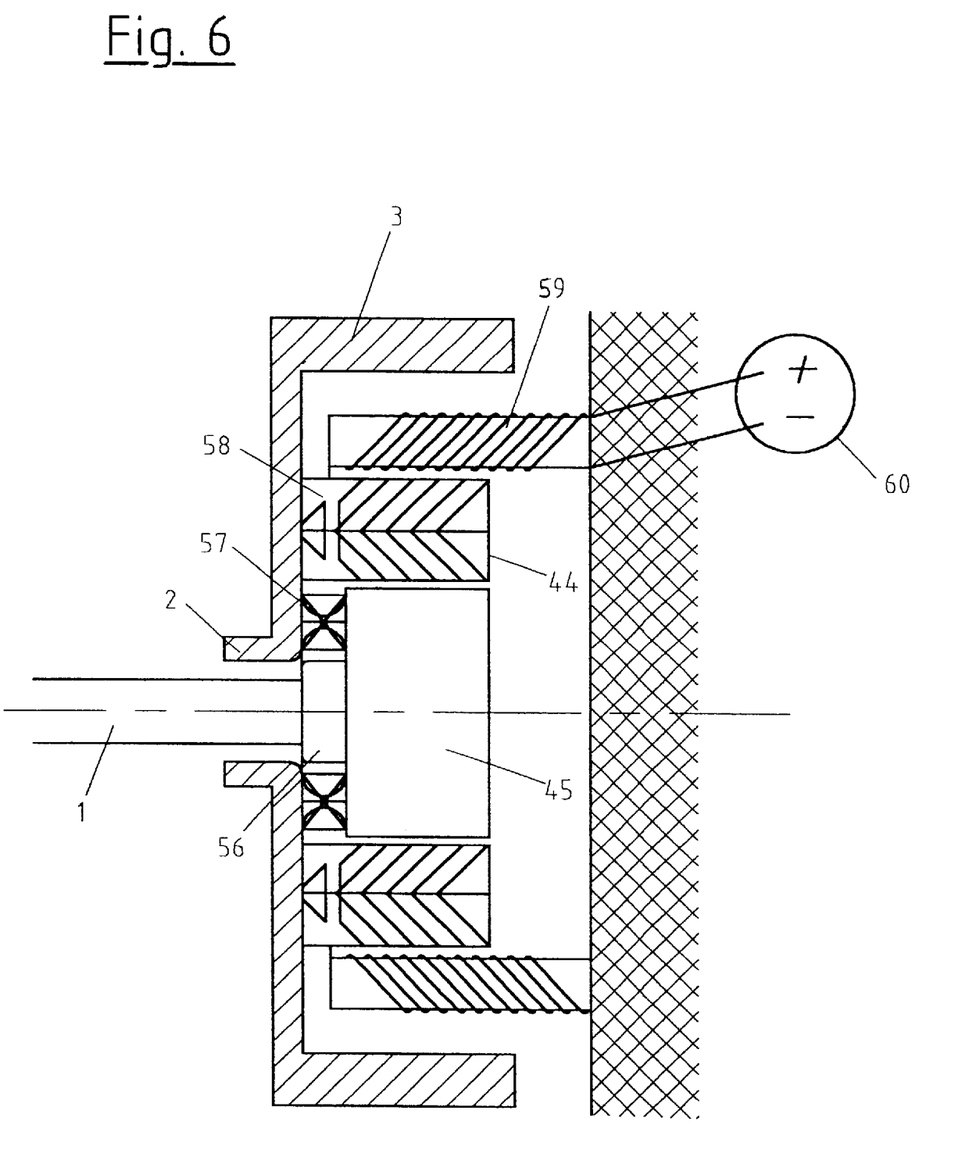

FIG. 6 shows schematically another variant of the invention. A motor winding 44 is rigidly connected to the sleeve 2, which is rotatable relative to the camshaft 1 and which has an integrated drive gear 3, so that the sleeve 2 constitutes the rotor of the electric motor. Another rotor of this electric motor is constituted by a short-circuit rotor 45 that communicates with the camshaft 1 via a Harmonic Drive 56 which only is diagrammatically hinted at in FIG. 1. The Harmonic Drive may be embodied as shown in the FIGS. 2 and 3A, 3B, 3C and 3D or it may be configured as a friction gear of mainly the same structure. The Harmonic Drive 56 has a big transmission ratio of for example 50:1 so that the electric motor only has to provide one fifty est of the adjusting torque of the camshaft 1. In order to limit the holding load to nearly zero when stationary, a double free-wheel 57 is provided between the short-circuit rotor 45 and the sleeve 2, said double free-wheel effecting that the drive torque of the camshaft 1 does not produce any torque on the electric motor, so that, when stationary, the electric motor does not have to provide any torque. Further more, a first coil arrangement 58 configured as a generator winding is connected to the rotor, said first coil arrangement also communicating electrically with the motor winding 44. A stationary coil arrangement 59 induces in the coil arrangement 58 a current that serves to move the short-circuit rotor 45 relative to the motor winding 44. The speed of the short-circuit rotor 45 relative to the motor winding 44 may be controlled via the current supply 60 of the stationary coil arrangement 59. Since only an exciting current has to be transmitted to the connection 60, the electrical supply system of the motor vehicle is hardly loaded by the adjusting device. When the first coil arrangement 58 has got twelve or eighteen poles for example and the motor winding 44 has got six poles, an electrical transmission ratio is created that guarantees a fast adjusting motion of the camshaft even at low speed.

Figure 7:
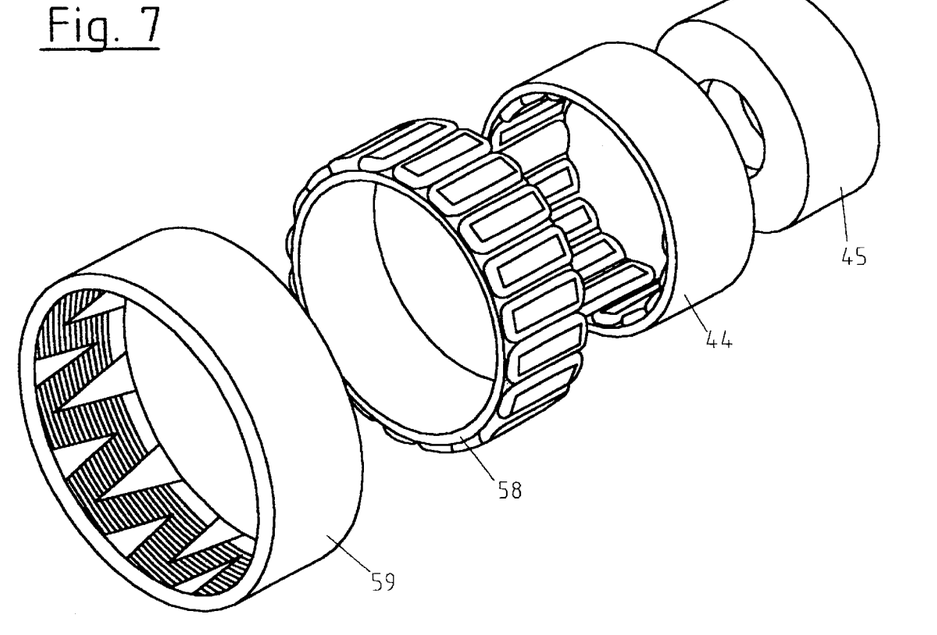

In FIG. 7, the stationary coil arrangement 59 representing the field winding, the first coil arrangement 58 representing the winding of the generator, the motor winding 4, which is connected mechanically and electrically to the first coil arrangement, and the short-circuit rotor 45 are depicted. In the illustrated variant, the different component parts are placed radially into each other. Any other geometric configuration like for example an axial arrangement with a disk rotor or an arrangement having the electric motor outside the generator may be chosen, when constructional circumstances so require. The short-circuit rotor 45 also may have a conical shape in order to optimize the torque behavior.

Figure 8:
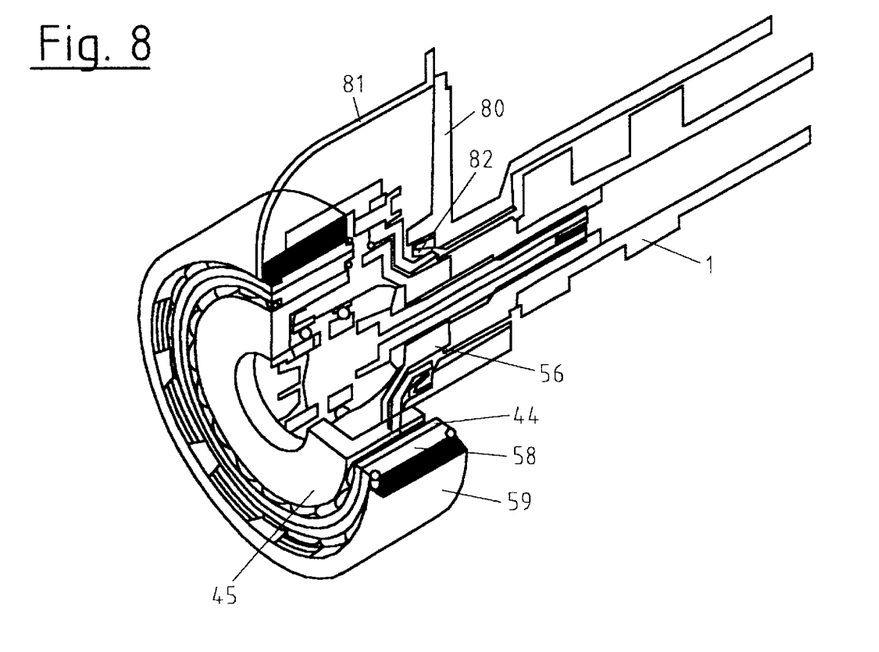

FIG. 8 shows schematically how the device according to the invention is built in. A housing 70 covers the camshaft 1, a cover 71 receives the stationary coil arrangement 59. A shaft seal 82 seals the adjusting device relative to the cylinder head.

Figure 9:
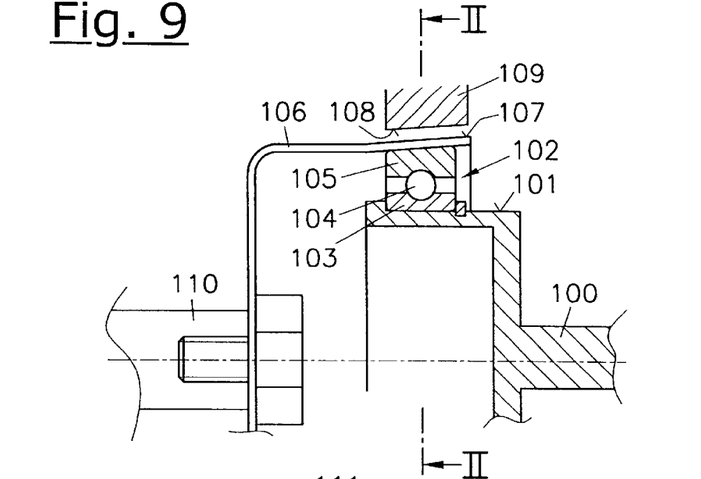
FIG. 9, 10, 11 and 11A are details of a further variant of the invention.

The gear of FIG. 9 consists of a motor shaft 100 provided on its end with a bearing surface 101 on which a roller bearing 102 configured as a ball bearing is wedged up. The roller bearing 102 has an inner ring 103 whose outer periphery is elliptical. The flexible outer ring 105 gets its elliptical shape by the rollers 104. Since the outer periphery of the outer ring 105 is slightly beveled, the ring as a whole adopts the shape of an elliptical cone. A flexible engaging part 106 sits close to the outer ring 105. The second plane of action 107 is arranged on the outer periphery of the engaging part 106, said second engaging part engaging a first engaging part 108 arranged on the inner periphery of a first engaging part 109. The first plane of action 109 has got the shape of a circular cone. An output shaft 110 is communicating with the engaging part 106. A thin-walled inner ring of uniform thickness that is fixed on an elliptical bearing surface may be used instead of an elliptical inner ring 103, so that an elliptical circumferential surface is obtained by resilient deformation.

Figure 10:
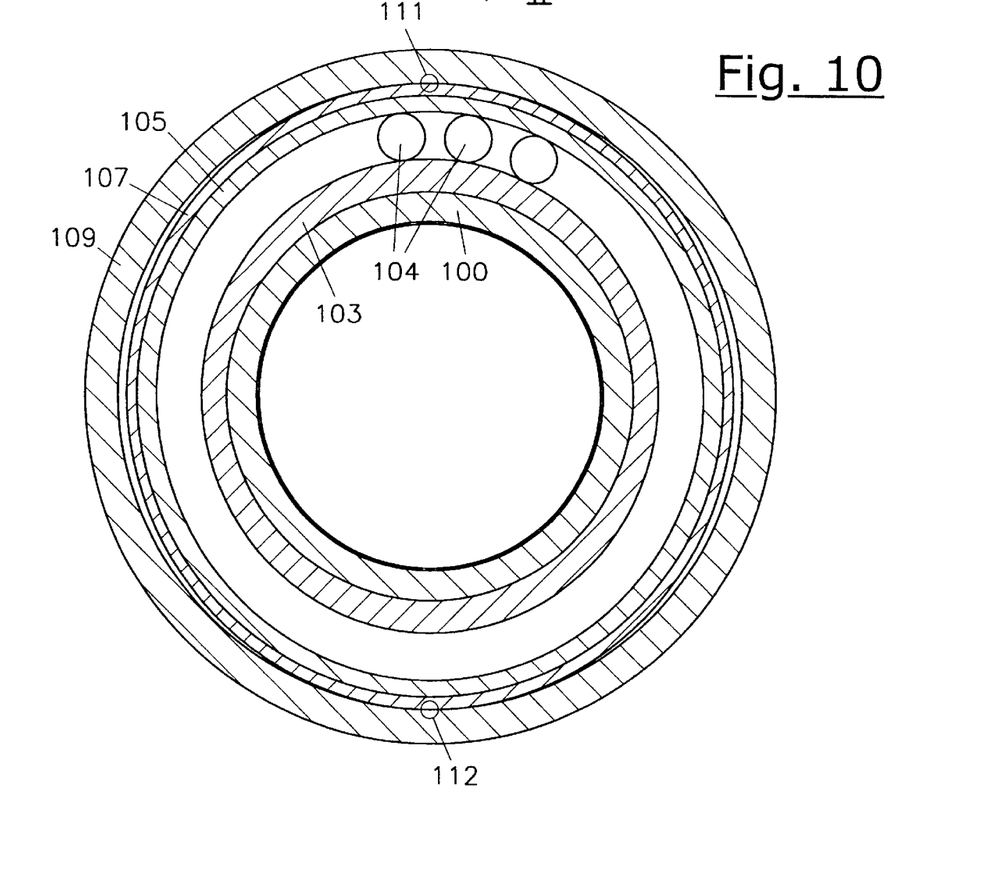

The way of operation of the device according to the invention is explained more thoroughly in the following. In the position illustrated in FIG. 10, the planes of action 107 and 108 are in contact in the areas 111 and 112, which are opposite to one another. When the motor shaft 100 rotates, these areas 111 and 112 creep along the first plane of action 108 until they reach their original position. The second plane of action 107 thereby rolls off on the first plane of action 108. Since the circumference $U_1$, of the first plane of action 108 is slightly bigger than the circumference $U_2$ of the second plane of action 107, the engaging part 106 rotates slightly in a direction opposite the direction of rotation of the motor shaft 100. The transmission ratio i, which is defined by the speed of the motor shaft over the speed of the output shaft, corresponds to the reciprocal value of the eccentricity ε, when the latter is defined according to the following equation:

$$\varepsilon = (U_1 - U_2)/U_1$$

Depending on the material chosen, values of i=1/ε may be achieved in a range of 100 through 300 and more. Generally speaking, the harder the substances used for the planes of action 107 and 108, the bigger the transmission ratio may become.

Figure 11:
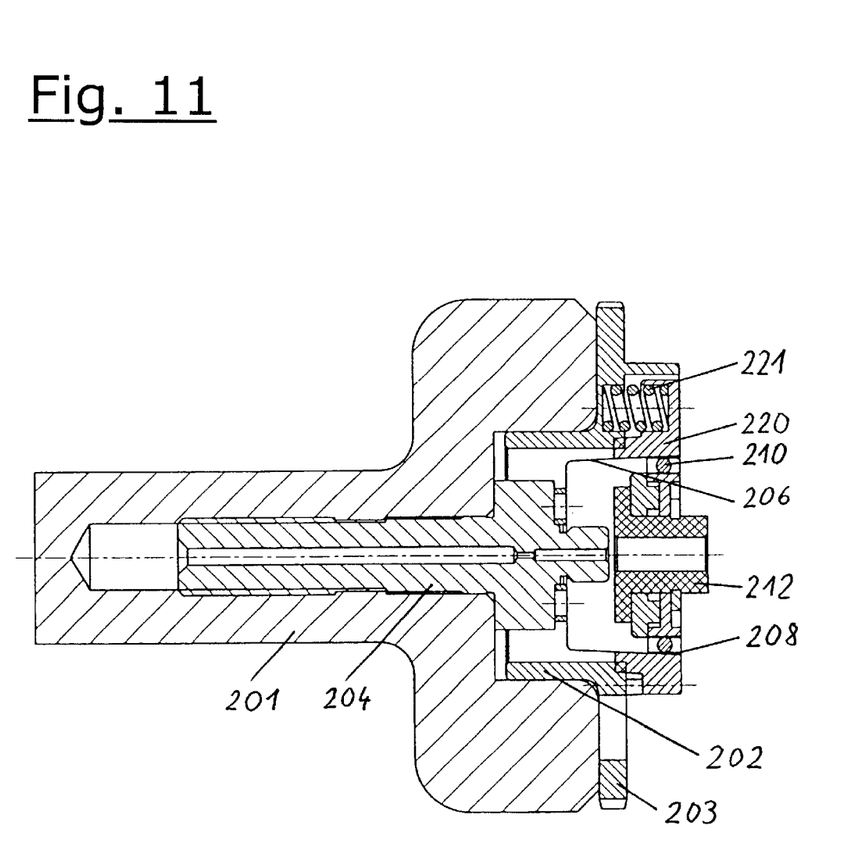

FIG. 11 shows a set of gears according to the invention that is part of an adjusting device for the camshaft of an internal combustion engine, which has not been illustrated in detail. A frictional wheel 206, configured as a thin-walled cylinder and constituting the flexible engaging part, is fixed to the camshaft 201 by means of a screw 204. A sleeve 202 having a sprocket wheel 203 integrated to it is rotatable relative to the camshaft 201. A roller bearing 210 is given an elliptical shape so that the frictional wheel 206 engages an engaging area of the sleeve 202 by only two points located opposite each other in circumferential direction. The circumference of the frictional wheel 206 is slightly smaller than the circumference of the plane of action 208, which is arranged on a ring 220 that may be displaced in axial direction relative to the sleeve 202 and that is configured as a hollow gear. The inner ring of the roller bearing 210 is rigidly connected in a drive element 212 communicating with an adjusting motor (not shown).

To make sure that the required pressure of the frictional wheel 206 acting against the ring 220 is permanent, a spring 221 is provided that prestresses the ring 220 relative to the sleeve 202.

Figure 11A:
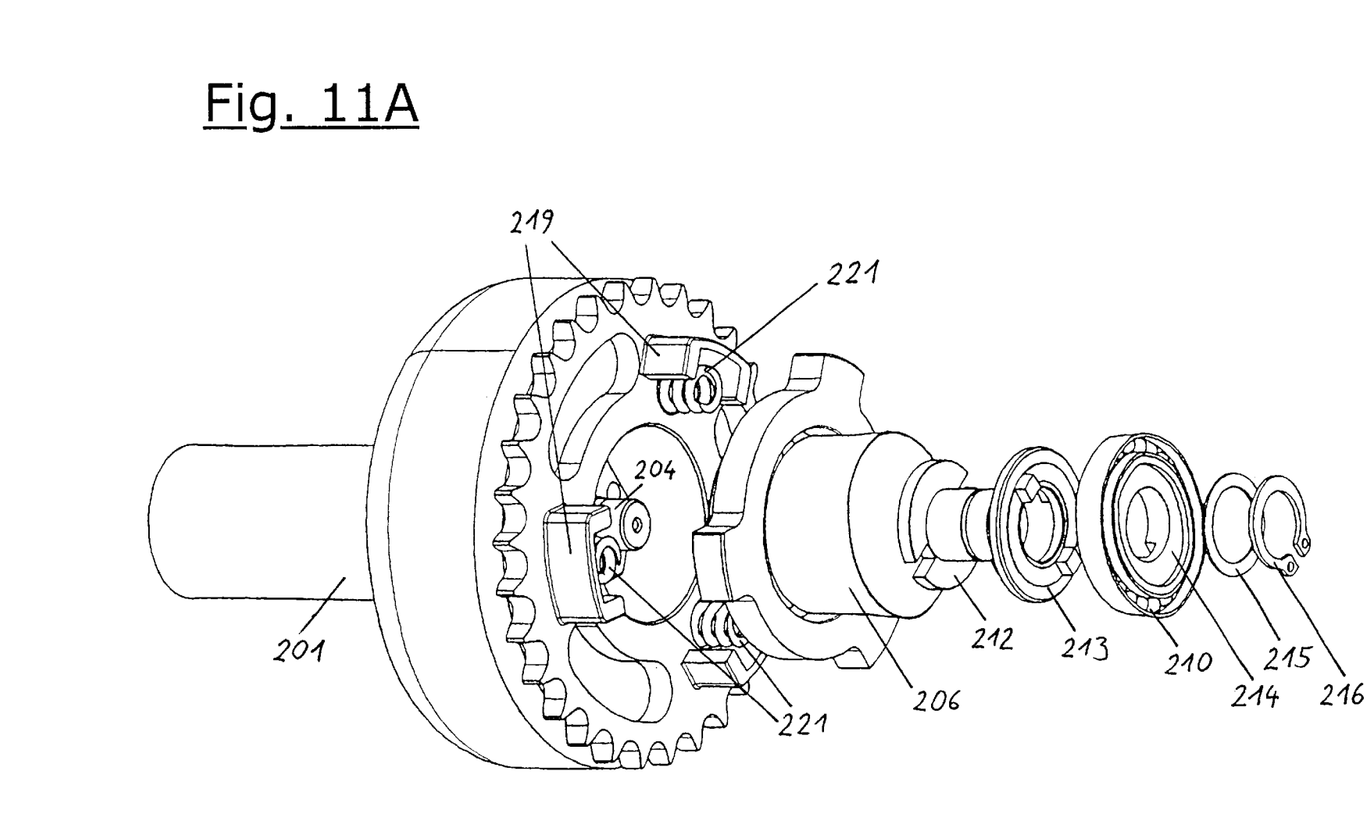

In FIG. 11A, an exploded view shows the structure of the above mentioned set of gears. Although the ring 220 is axially slidable in guides 219 on the sprocket wheel 203, it is non rotatably borne. The drive element 212 is connected to a support 214 for the inner ring of the roller bearing 210 via a ring 213. The connection is secured by a disk 215 and by a Seeger circlip ring.

The present invention permits creation of an electric motor driven adjustment of the camshaft of an internal combustion engine that has got a particularly simple design and that is particularly robust and long-lived due to the fact that it avoids any slip contacts.

I claim:

1. A device for adjusting the phase angle of a camshaft of an internal combustion engine with a drive gear for driving a camshaft accommodated in a coaxial arrangement relative to the camshaft;

an electric motor for rotating the camshaft relative to the drive gear, having two concentrically arranged rotors, of which the one is connected to the camshaft and the other to the drive gear;

a first coil arrangement which is non rotatably linked to one of the rotors; and a stationary coil arrangement electromagnetically interacting with the first coil arrangement in order to induce or to transmit the energy needed for the operation of the electric motor.

2. A device according to claim 1, wherein the electric motor communicates with a reducing gear for effecting a relative motion between the drive gear and the camshaft within a predetermined angular range, wherein the reducing gear is arranged between one of the rotors and the camshaft.

3. A device according to claim 2, wherein the reducing gear is configured as a Harmonic Drive consisting of a rigid, circular hollow gear and a flexible, externally toothed gear arranged on a roller bearing with elliptical inner ring and engaging the hollow gear.

4. A device according to claim 3, wherein a rotor is directly connected to the elliptical inner ring of the roller bearing and that the internally toothed gear is rigidly connected to the other rotor.

5. A device according to claim 2, wherein the set of gears consists of the following component parts: a first plane of action arranged on the inner periphery of a first engaging part, a second plane of action arranged on the outer periphery of a flexible engaging part and engaging the first plane of action and a driving member arranged coaxially to the first engaging part and to the flexible engaging part, a roller bearing provided with a non circular inner ring being accommodated on said driving member and having a flexible outer ring connected to the flexible engaging part and pushing it by preferably two points against the first engaging part, wherein the first plane of action of the first engaging part frictionally engages the second plane of action of the flexible engaging part.

6. A device according to claim 5, wherein the inner ring of the roller bearing is elliptical in cross section.

7. A device according to claim 5, wherein a pressure means configured as a spring is provided that presses the first plane of action against the second plane of action in axial direction.

8. A device according to claim 1, wherein a rotor of the electric motor is essentially configured as a tube-shaped sleeve that supports on its inner periphery a winding electromagnetically interacting with a winding or with a permanent magnet arranged on the other rotor, and that the sleeve, which is preferably rigidly connected to the drive gear, has on its external periphery a coil arrangement cooperating with a stationary coil arrangement.

9. A device according to claim 1, wherein the inner rotor of the two rotors has got the shape of a tube.

10. A device according to claim 1, wherein the coil arrangements consist of at least one winding each, said winding essentially being arranged in circumferential direction.

11. A device according to claim 1, wherein one rotor is connected to the other rotor via a ribbon cable in order to transmit electric power for the energization of a rotor and that one rotor is fitted with an electronic control unit for evaluating the control signals transmitted via the ribbon cable.

12. A device according to claim 1, wherein the two rotors are provided each with an independent coil arrangement, each of which interacting with a corresponding stationary coil arrangement.

13. A device according to claim 1, wherein the first coil arrangement and the stationary coil arrangement are configured as a rotary current generator.

14. A device according to claim 13, wherein the stationary coil arrangement is provided with a number of poles which is superior to the one of the rotors of the electric motor.

15. A device according to claim 1, wherein a rotor is configured as a short-circuit rotor which preferably is connected to the camshaft via a set of gears.

16. A device according to claim 1, wherein the drive gear communicates with the crankshaft via a frictionally engaged drive.

* * * * *